(12) United States Patent
Yoshizawa et al.

(10) Patent No.: US 9,278,603 B2
(45) Date of Patent: Mar. 8, 2016

(54) SEMIMANUFACTURED PRODUCT OF MOVEMENT REGULATION MEMBER, STABILIZER BAR HAVING MOVEMENT REGULATION MEMBER, AND METHOD FOR INSTALLING SEMIMANUFACTURED PRODUCT OF MOVEMENT REGULATION MEMBER TO A STABILIZER BAR

(71) Applicants: NHK SPRING CO., LTD., Yokohama, Kanagawa (JP); NHK SPRING PRODUCTION COMPANY, Isehara, Kanagawa (JP)

(72) Inventors: Toshiharu Yoshizawa, Kanagawa (JP); Juichi Sugita, Kanagawa (JP)

(73) Assignees: NHK SPRING CO., LTD., Yokohama (JP); NHK SPRING PRODUCTION COMPANY, Isehara (JP)

( * ) Notice: Subject to any disclaimer, the term of this patent is extended or adjusted under 35 U.S.C. 154(b) by 0 days.

(21) Appl. No.: 14/427,098

(22) PCT Filed: Sep. 3, 2013

(86) PCT No.: PCT/JP2013/073656
§ 371 (c)(1),
(2) Date: Mar. 10, 2015

(87) PCT Pub. No.: WO2014/042038
PCT Pub. Date: Mar. 20, 2014

(65) Prior Publication Data
US 2015/0343876 A1 Dec. 3, 2015

(30) Foreign Application Priority Data

Sep. 11, 2012 (CN) .......................... 2012 1 0334917
Sep. 11, 2012 (CN) ...................... 2012 2 0461859 U

(51) Int. Cl.
*B60G 21/055* (2006.01)
*B23P 11/00* (2006.01)
(Continued)

(52) U.S. Cl.
CPC ........... *B60G 21/0551* (2013.01); *B23P 11/005* (2013.01); *F16B 2/00* (2013.01); *Y10T 29/49909* (2015.01); *Y10T 403/46* (2015.01)

(58) Field of Classification Search
CPC ..................... B60G 21/0551; B60G 2202/135; B60G 2204/1222; B60G 2204/4307; B60G 2204/45; B60G 2204/4504; B60G 2206/427; B60G 2206/8209; B60G 2206/82092; B23P 11/005; F16B 2/00; F16B 2/02; F16B 2/06; F16B 2/10; Y10T 403/46; Y10T 29/49909
See application file for complete search history.

(56) References Cited

U.S. PATENT DOCUMENTS 2,283,918 A 5/1942 Arthur
6,685,381 B1 2/2004 Sugita et al.
(Continued)

FOREIGN PATENT DOCUMENTS

JP 60-145639 9/1985
JP 02-168005 6/1990
(Continued)

OTHER PUBLICATIONS

International Search Report, Date of Mailing: Nov. 12, 2013.

*Primary Examiner* — Laura Freedman
(74) *Attorney, Agent, or Firm* — Rankin, Hill & Clark LLP

(57) ABSTRACT

A semimanufactured product of a stopper includes: a plate-shaped bridging portion; a first curved portion extending from one end portion of the bridging portion integrally; and a second curved portion extending from the other end portion of the bridging portion integrally, and an entirety of the semimanufactured product is formed in a C-shape. The first curved portion includes a first locking part at the end portion. The second curved portion includes a second locking part that engages with the first locking part at the end portion. The first locking part includes a convex-shaped convex portion and a pair of receiving portions positioned so as to sandwich the convex portion. The second locking part includes: a concave-shaped concave portion which can accommodate the convex portion; and a pair of projecting portions positioned so as to sandwich the concave portion.

11 Claims, 11 Drawing Sheets

(51) Int. Cl.
*F16B 2/02* (2006.01)
*F16B 2/06* (2006.01)
*F16B 2/00* (2006.01)

(56) References Cited

U.S. PATENT DOCUMENTS

2003/0204979 A1* 11/2003 Blease .................... G09F 21/04
 40/597
2006/0235391 A1* 10/2006 Sutterlin ............ A61B 17/7064
 606/86 A
2007/0161987 A1* 7/2007 Capote ............... A61B 17/7037
 606/86 A
2011/0046674 A1* 2/2011 Calvosa ............. A61B 17/7065
 606/249
2011/0150566 A1* 6/2011 Schall ................... F16B 7/0446
 403/347
2013/0176401 A1* 7/2013 Monari ................ H04N 5/2252
 348/47
2015/0322784 A1* 11/2015 Liu ........................ E21C 27/28
 299/10

FOREIGN PATENT DOCUMENTS

JP 11-210713 8/1999
JP 2001-163026 6/2001

* cited by examiner

… … …

SEMIMANUFACTURED PRODUCT OF MOVEMENT REGULATION MEMBER, STABILIZER BAR HAVING MOVEMENT REGULATION MEMBER, AND METHOD FOR INSTALLING SEMIMANUFACTURED PRODUCT OF MOVEMENT REGULATION MEMBER TO A STABILIZER BAR

TECHNICAL FIELD

The present invention relates to a stabilizer bar that suppresses rolling of a vehicle body and improves running stability of the vehicle, and in particular, to a semimanufactured product of a movement regulation member to be installed onto a stabilizer bar, a stabilizer bar having a movement regulation member and a method for installing a semimanufactured product of a movement regulation member to a stabilizer bar.

BACKGROUND ART

A cylindrical member called a stabilizer bar is used in order to suppress rolling of a vehicle body and to improve running stability of the vehicle (for example, refer to Patent Document 1). The above-described stabilizer bar has a torsion bar portion extending linearly in the vehicle width direction and a pair of arm portions respectively extending from both ends of the torsion bar portion, and the entirety of the stabilizer bar is formed in a U-shape, for example.

The stabilizer bar is installed onto the vehicle body via a buffer member made of rubber and a U-shaped bracket in a portion of the torsion bar portion near both arm portions. Meanwhile, ends of both arm portions are supported by suspension arms.

In a stabilizer bar configured as described above, when the torsion bar portion of the stabilizer bar is twisted at the time of a circular run of a vehicle, the reaction force produced by the twist of the torsion bar portion acts as a force that suppresses rolling of the vehicle body.

A pair of movement prevention members (hereafter referred to as "stopper") of flange shape are respectively provided in positions of the torsion bar portion of the stabilizer bar adjoining the buffer member. If movement in the axial direction of the torsion bar portion is left uncontrolled when large force in the vehicle width direction is input onto the torsion bar portion at the time of the circular run of the vehicle, that causes a problem such as the torsion bar portion causing abnormal noise by interfering with vehicle body accessories.

Accordingly, in Patent Document 1, the flange portion of a pair of annular stoppers described above provided on the torsion bar portion is configured to contact with the buffer member when large force in the vehicle width direction is input onto the torsion bar portion at the time of a circular run of the vehicle. According to the stopper in Patent Document 1, it is possible to prevent problems caused by the torsion bar portion interfering with the vehicle body accessories in advance by regulating the movement of the torsion bar portion in the axial direction.

PRIOR TECHNICAL DOCUMENT

Patent Document

[Patent Document 1] JP 2001-163026 A

SUMMARY OF THE INVENTION

Upon installing the stopper to the torsion bar portion of the stabilizer bar, first, it is required to not produce the positional movement of the stopper in the axial direction of the stabilizer bar even if large force is input to the torsion bar portion in the axial direction. Second, it is required that the management of the semimanufactured product of the stopper, which is a semimanufactured product in the stage before installing the stopper, is easy. Third, it is required to be able to deal with automatic assembly. Fourth, it is required that the installation process is simple. Considering the above points, there is still a room for improving the movement prevention technique of a stabilizer bar according to Patent Document 1 from the viewpoint of meeting the above-described four requirements at high level.

The present invention has been achieved in view of the above-described situations and aims to obtain a semimanufactured product of a stopper, and a stabilizer bar having a stopper, which can be reliably installed with a simple process that can deal with automatic assembly, reliably prevent positional movement of the stopper in the axial direction of the stabilizer bar, and make parts management easier.

In addition, the present invention aims to provide a method for installing a semimanufactured product of a stopper onto a stabilizer bar, which can reliably install the stopper onto the stabilizer bar with a simple process that can deal with automated assembly.

In order to achieve the above-described object, an embodiment of (1) has a main feature of a semimanufactured product of a stopper to be installed onto a stabilizer bar for a vehicle, wherein the semimanufactured product includes: a plate-shaped bridging portion; a first curved portion which extends from one end portion of the bridging portion integrally; and a second curved portion which extends from the other end portion of the bridging portion integrally, and an entirety of the semimanufactured product is formed in a C-shape; the first curved portion includes a first locking part at an end portion of the first curved portion; the second curved portion includes a second locking part that engages with the first locking part at an end portion of the second curved portion; the first locking part includes a convex-shaped convex portion and a pair of receiving portions positioned so as to sandwich the convex portion; the second locking part includes a concave-shaped concave portion which can accommodate the convex portion and a pair of projecting portions positioned so as to sandwich the concave portion; each of the pair of projecting portions includes a protruding portion which protrudes from a tip portion of the projecting portion toward an opening of the concave portion; the convex portion includes a constricted portion in a base end portion of the convex portion; the pair of receiving portions include: a shoulder portion which is positioned at an outer side of the first locking part in a width direction and projects in an expanding direction of the convex portion; and a guide surface which is inclined to a direction opposite to the expanding direction of the convex portion toward the constricted portion with respect to the shoulder portion; height of the pair of protruding portions is larger as compared with depth of the concave shape of the guide surface; a gap between the first and second locking parts is larger as compared with diameter of the stabilizer bar, and the semimanufactured product of the stopper is to be installed onto the stabilizer bar as a completed product by making an inner circumferential surface of the bridging portion and the first and second curved portions pressingly contact with an outer circumferential surface of the stabilizer bar using a pair of molds which cover outer peripheral sides of the first and second curved portions, respectively, in a state where the stabilizer bar is placed onto an inner circumferential surface of one curved portion among the first and second curved portions by passing the stabilizer bar through the gap; by accommodating the convex portion in the concave portion upon administrating clamping work that makes the first and second locking parts engage with each other; and by the pair of protruding portions being plastically deformed so as to fill concave spaces sectioned by the guide surface including the constricted portions toward an inner side in a width direction of the first locking part by being pressed onto the guide surfaces which are continuous to the shoulder portions after contacting the guide surface of the pair of receiving portions.

According to the embodiment of (1), the stopper can be reliably installed onto the stabilizer bar with a simple process that can deal with automatic assembly, and the positional movement of the stopper in the axial direction of the stabilizer bar can be reliably prevented and management of the parts is easier.

Meanwhile, an embodiment of (2) has a main feature of a method for installing a semimanufactured product of a stopper onto a stabilizer bar for a vehicle, wherein the semimanufactured product includes: a plate-shaped bridging portion; a first curved portion which extends from one end portion of the bridging portion integrally; and a second curved portion which extends from the other end portion of the bridging portion integrally, and an entirety of the semimanufactured product is formed in a C-shape; the first curved portion includes a first locking part at an end of the first curved portion; the second curved portion includes a second locking part that engages with the first locking part at an end portion of the second curved portion; the first locking part includes a convex-shaped convex portion and a pair of receiving portions positioned so as to sandwich the convex portion; the second locking part includes a concave-shaped concave portion which can accommodate the convex portion and a pair of projecting portions positioned so as to sandwich the concave portion; each of the pair of projecting portions includes a protruding portion which protrudes from a tip portion of the projecting portion toward an opening of the concave portion; the convex portion includes a constricted portion in a base end portion of the convex portion; the pair of receiving portions include: a shoulder portion which is positioned at an outer side of the first locking part in a width direction and projects in an expanding direction of the convex portion; and a guide surface which is inclined to a direction opposite to the expanding direction of the convex portion toward the constricted portion with respect to the shoulder portion; height of the pair of protruding portions is larger as compared with depth of the concave shape of the guide surface; a gap between the first and second locking parts is larger as compared with diameter of the stabilizer bar; a step of setting the first and second curved portions to the first and second molds that have the cavity in which an outer circumferential surface of the first and second curved portions is accommodated, respectively, respectively; a step of placing the stabilizer bar on an inner circumferential surface of one curved portion among the first and second curved portions by passing the stabilizer bar through the gap; a step of making an inner circumferential surface of the bridging portion and the first and second curved portions pressingly contact with to an outer peripheral surface of the stabilizer bar using the first and second molds in a state where the stabilizer bar is placed onto an inner circumferential surface of the one curved portion, and performing clamping work which makes the first and second locking parts engage with each other; and the semimanufactured product of the stopper is to be installed onto the stabilizer bar as a completed product in the step of performing clamping work, by the convex portion being accommodated in the concave portion, by the pair of protruding portions being plastically deformed so as to fill concave spaces sectioned by the guide surface including the constricted portions toward an inner side in a width direction of the first locking part by being pressed onto the guide surfaces which are continuous to the shoulder portions after contacting the guide surface of the pair of receiving portions.

According to the embodiment of (2), the stopper can be reliably installed onto the stabilizer bar with a simple process that can deal with automatic assembly.

According to the present invention, it is possible to obtain a semimanufactured product of a stopper in which the positional movement of the stopper in the axial direction of the stabilizer bar can be reliably prevented, management is easier, it is possible to deal with automatic assembly, and the installation process is simple. In addition, according to the present invention, it is possible to obtain a method for installing a semimanufactured product of a stopper that can reliably install the stopper onto the stabilizer bar with a simple process that can deal with automatic assembly.

DETAILED DESCRIPTION OF THE INVENTION

Figure 1:
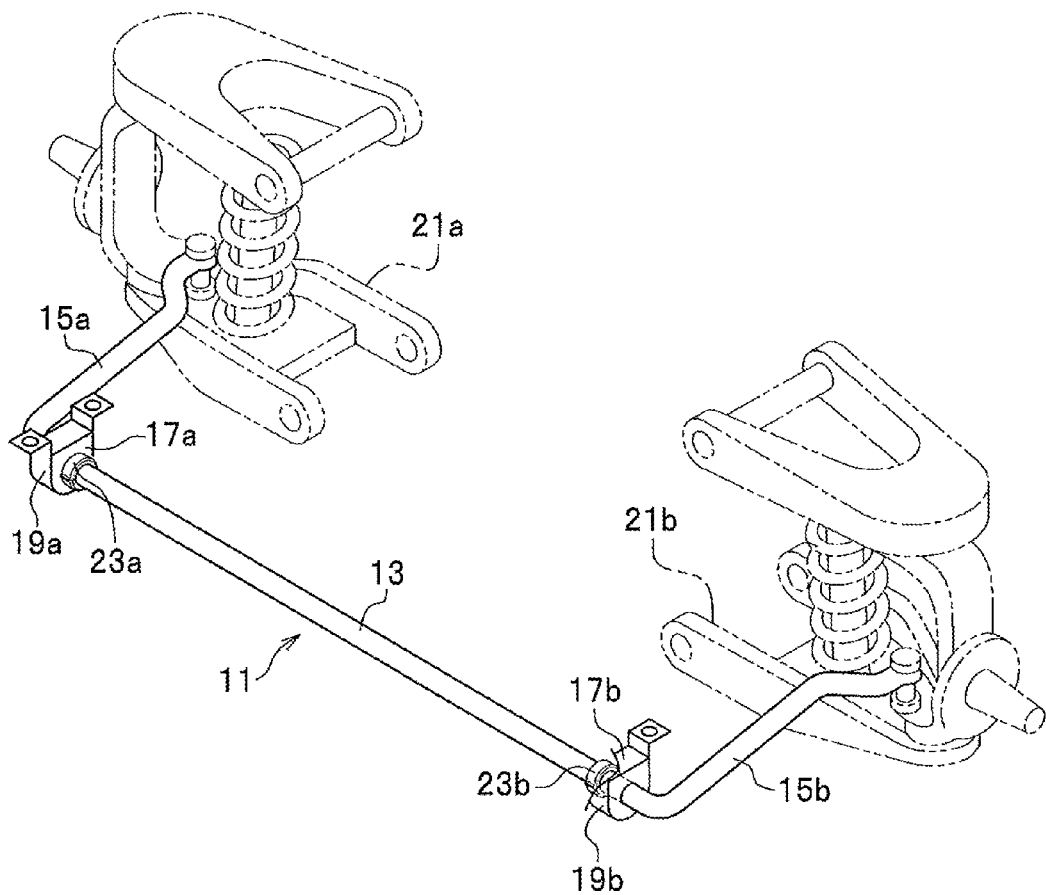
FIG. 1 shows a perspective view that schematically illustrates the installed state of the stabilizer bar to a vehicle having the stopper.

Hereafter, the semimanufactured product of the stopper, the stabilizer bar having the stopper and the method for installing the semimanufactured product of the stopper to the stabilizer bar according to the embodiment of the present invention will be described in detail with reference to the drawings.

First, a rule for assigning reference numerals that are used for ease of describing the embodiment of the present invention will be described. Some of the articles that are referred to in the description according to the embodiment of the present invention (for example, semimanufactured product of the stopper) form line symmetry to a predetermined central line due to the configuration of the articles. In such articles that form line symmetry, the same numeral label is assigned between articles that have a common function. In addition, in an article that is illustrated in the perspective view and forms line symmetry, subscript a is added on the right of the numerical label of a component that resides on the left side when viewed the article and subscript b is added on the right of the numerical label for components that reside on the right side. Furthermore, when generically referring to members having a common function, "first and second" or subscript may be omitted by using only the numerical labels (in this case, labels in the drawings may be referred to by omitting subscripts a and b from the labels).

[Configuration for Installing the Stabilizer Bar 11 to the Vehicle]

The configuration for installing the stabilizer bar 11 to the vehicle having the stopper 23 will be described with reference to FIG. 1 before describing the semimanufactured product of the stopper 31 according to an embodiment of the present invention. FIG. 1 shows a perspective view that schematically illustrates the state where the stabilizer bar having the stopper 23 is installed onto the vehicle 11.

As shown in FIG. 1, a metal member having a hollow cylinder shape, which is called a stabilizer bar 11, is installed onto the vehicle in order to suppress rolling of the vehicle body and to improve running stability of the vehicle. The stabilizer bar 11 includes, for example, a torsion bar portion 13 extending linearly in the vehicle width direction, and first and second arm portions 15a and 15b respectively extending from both ends of the torsion bar portion 13, and the entirety is formed in a U-shape.

The above-described stabilizer bar 11 is installed onto the vehicle body via, for example, first and second buffer members 17a and 17b, which are made of rubber, and U-shaped first and second brackets 19a and 19b, in portions at the side of the above-described arm portions 15a and 15b out of the torsion bar portion 13. Meanwhile, each end portion of the first and second arm portions 15a and 15b is respectively supported by first and second suspension arms 21a and 21b.

In the stabilizer bar 11 configured as described above, when the torsion bar portion 13 is twisted in the circumferential direction of the axis at the time of a circular run of the vehicle, reaction force in the circumferential direction of the axis produced due to the twist of the torsion bar portion 13 acts as force that suppresses rolling of the vehicle body.

The first and second stoppers 23a and 23b of flange shape are respectively provided at positions adjoining the first and second buffer members 17a and 17b in the torsion bar portion 13 of the stabilizer bar 11. Suppose movement of the torsion bar portion 13 in the axial direction is left uncontrolled when large force in the vehicle width direction is input onto the torsion bar portion 13 at the time of a circular run of the vehicle, it may cause problems such as abnormal noise by the torsion bar portion 13 interfering with the vehicle body accessories.

Accordingly, when large force in the vehicle width direction is input onto the torsion bar portion 13 at the time of a circular run of the vehicle, flange portions of the first and second stopper 23a and 23b installed onto the torsion bar portion 13 are configured to press and contact with the first and second buffer members 17a and 17b. According to the stopper 23 configured in this way, it is possible to prevent problems that occur by the stabilizer bar 11 interfering with the vehicle body accessories in advance by regulating the movement of the stabilizer bar 11 in the axial direction.

[Semimanufactured Product of the Stopper According to an Embodiment of the Present Invention]

Figure 2:
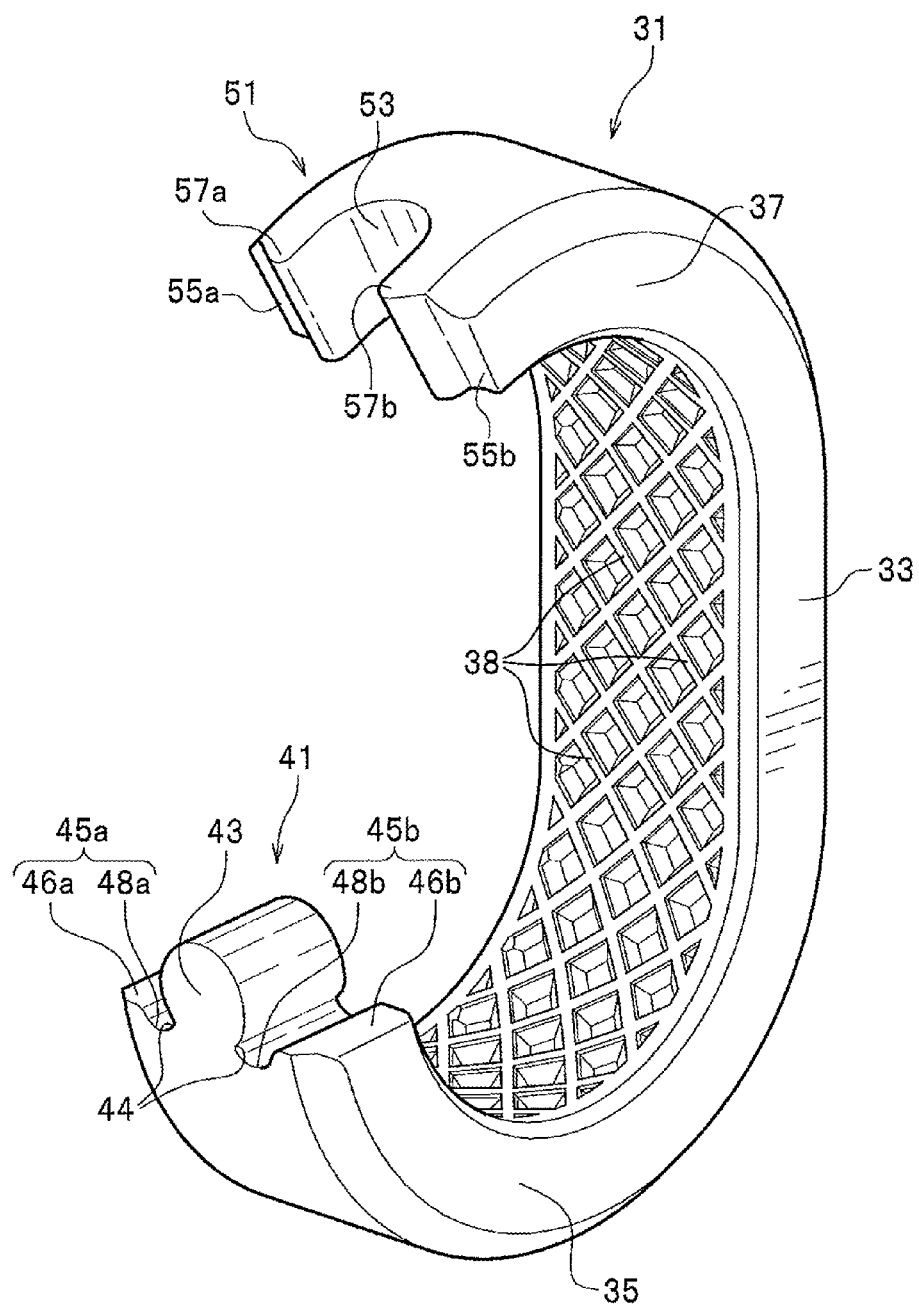
FIG. 2 shows an external perspective view that illustrates the semimanufactured product of the stopper according to an embodiment of the present invention.
Figure 3:
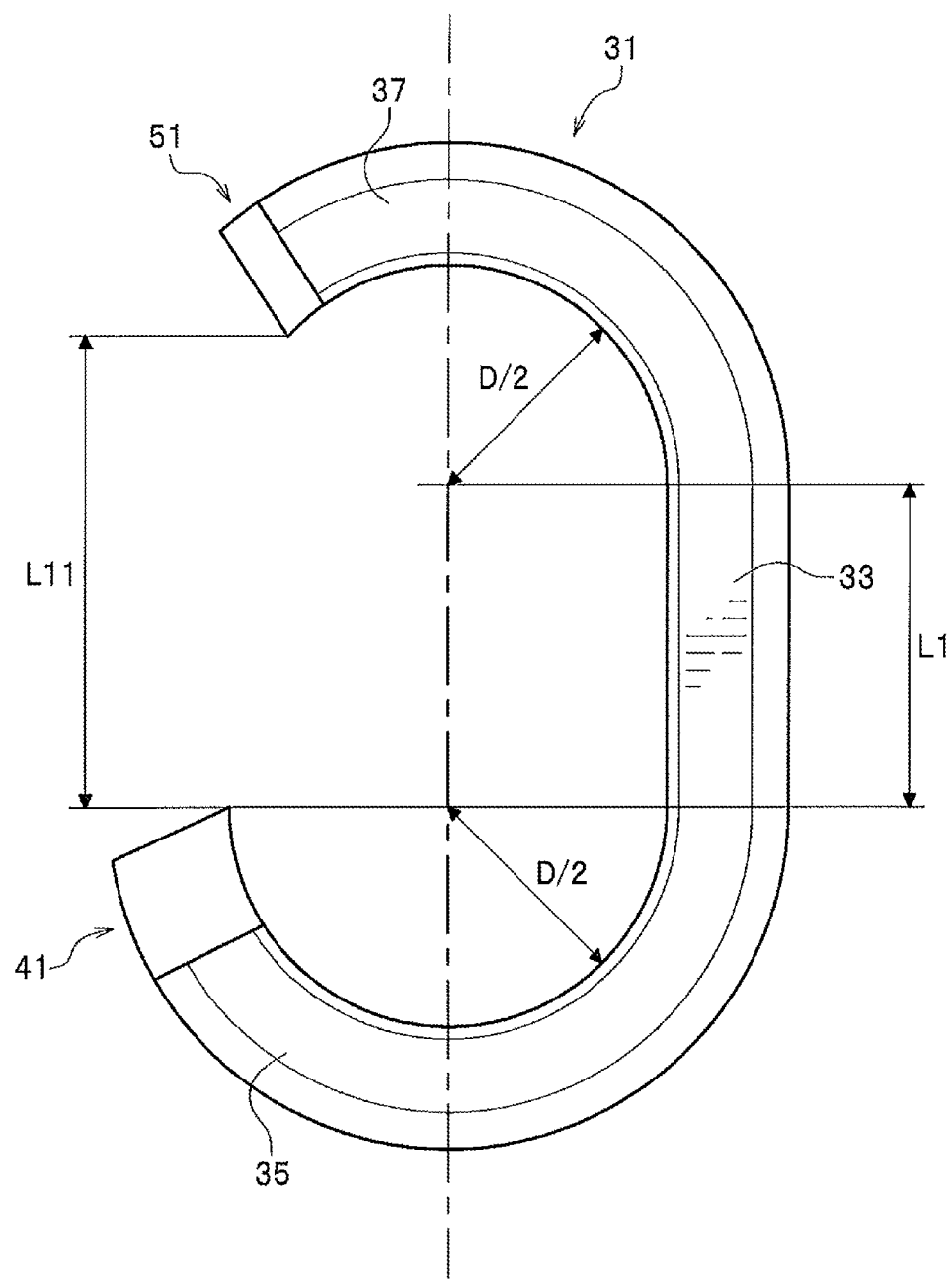
FIG. 3 shows a side view that illustrates the semimanufactured product of the stopper.

Next, the semimanufactured product of the stopper 31 according to an embodiment of the present invention will be described with reference to FIG. 2 to FIG. 6. As shown in FIG. 2 and FIG. 3, the semimanufactured product of the stopper 31 according to the embodiment of the present invention includes: a plate-shaped bridging portion 33; a first curved portion 35 which extends integrally from one end portion of the bridging portion 33; and a second curved portion 37 which extends integrally from the other end portion of the bridging portion 33. The entirety of the semimanufactured product of the stopper 31 is formed in a C-shape. The semimanufactured product of the stopper 31 is constituted with metal, such as aluminum or aluminum alloy.

Figure 4:
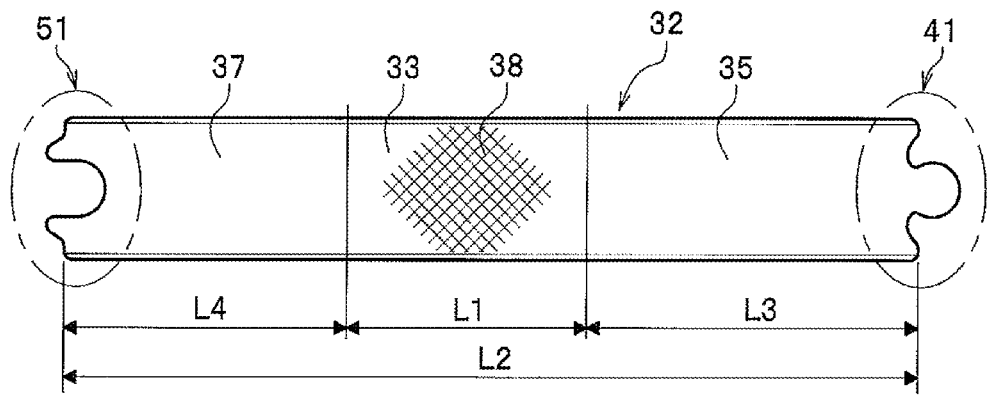
FIG. 4 shows a plan view that illustrates an uncompleted product of the semimanufactured product of the stopper before bending work is performed in the manufacturing process of the semimanufactured product of the stopper.
Figure 5:
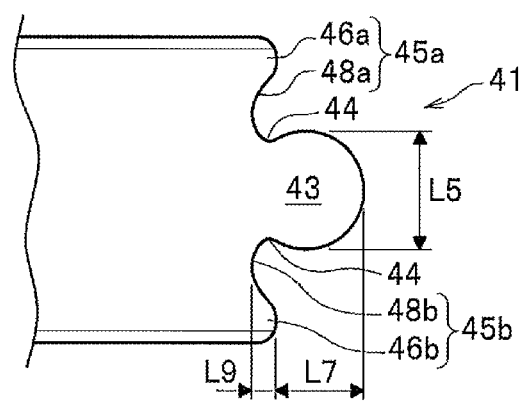
FIG. 5 shows a plan view that illustrates the first locking part, which is a principal part in FIG. 4.
Figure 6:
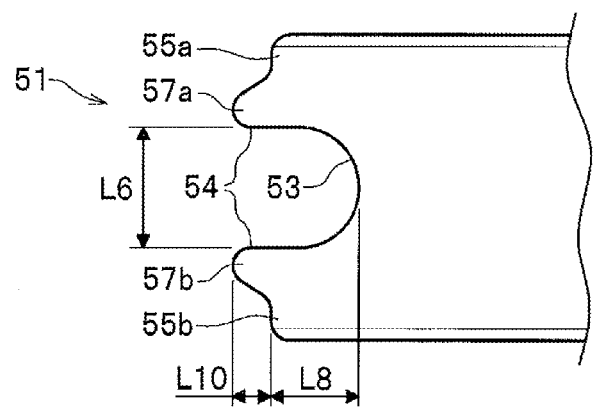
FIG. 6 shows a plan view that illustrates the expanded second locking part, which is a principal part in FIG. 4.

The semimanufactured product of the stopper 31 is manufactured by incurvating both ends of the plate-shaped bridging portion 33, which constitutes the center portion of a plate-shaped uncompleted product 32 (refer to FIG. 4 to FIG. 6). Length of the plate-shaped bridging portion 33 is set to L1 (refer to FIG. 3 and FIG. 4). In addition, length L2 (refer to FIG. 4) of the uncompleted product 32 is set to:

$$L2 = \pi \times (D+T) + \alpha,$$

wherein D is diameter of the stabilizer bar 11; T is board thickness of the uncompleted product 32; and α is design tolerance (+3, −0).

The stabilizer bar 11 is set onto the inner circumferential surface of the first curved portion 35 in a process in Step 2 described later (refer to FIG. 7). Here, for the purpose of securing the contact area with the stabilizer bar 11 and stabilizing the state of the stabilizer bar 11 set onto the inner circumferential surface of the first curved portion 35, the length L3 of the first curved portion 35 along the curving direction is set longer as compared with length L4 of the second curved portion 37 along the curving direction (refer to FIG. 4). In addition, the radius of curvature of the first curved portion 35 is set to comparable size to the radius (D/2) of the stabilizer bar 11 (refer to FIG. 3). Furthermore, length L3 of the first curved portion 35 along the curving direction is preferably set greater than or equal to ½ of peripheral length (πD) of the stabilizer bar 11(L3≥πD/2).

As shown in FIG. 3 and FIG. 4, anti-sliding work such as knurl 38 is administered onto the inner circumferential surface of the bridging portion 33 and the first and second curved portions 35 and 37, which pressingly contact with the outer peripheral surface of the stabilizer bar 11. As a result, in the clamping process in Step 4 described later (refer to FIG. 7), the knurl 38 formed on the inner circumferential surface of the bridging portion 33 and the first and second curved portions 35 and 37 advances into the outer circumferential painted surface of the stabilizer bar 11, and thereby positional movement of the stopper 23 in the axial direction of the stabilizer bar 11 can be reliably prevented.

A first locking part 41 is provided at the end portion of the first curved portion (This includes portions that constitute the first curved portion in the uncompleted product 32 shown in FIG. 4. This is the same hereinafter.). The first locking part 41 includes a convex-shaped convex portion 43, and first and second receiving portions 45a and 45b that are positioned so as to sandwich the convex portion 43. As shown in FIG. 2 and FIG. 5, an end portion of the convex portion 43 in the expanding direction is arc shaped.

The convex portion 43 has constricted portions 44 in base end portions. The constricted portions 44 have an important role of strengthening engagement force between the first and second locking parts 41 and 51 by working together with the first and second protruding portions 57a and 57b described later. This will be described later in detail.

The first and second receiving portions 45a and 45b have first and second shoulder portions 46a and 46b which are positioned outside in the width direction of the first locking part 41 and project in the expanding direction of the convex portion 43. In addition, the first and second receiving portions 45a and 45b have first and second guide surfaces 48a and 48b which are curved and dented toward directions toward the constricted portions 44 with respect to the first and second shoulder portions 46a and 46b and opposite to the expanding directions of the convex portion 43. The first and second guide surfaces 48a and 48b have an important role of guiding the first and second protruding portions 57a and 57b described later toward the concave space at the constricted portions 44. This will be described later in detail.

Meanwhile, the second curved portion 37 (This includes portions that constitute the second curved portion in the uncompleted product 32 shown in FIG. 4. This is the same hereinafter.) includes a second locking part 51 that engages with the first locking part 41 at the end portion. The radius of curvature of the second curved portion 37 is set to comparable size to the radius (D/2) of the stabilizer bar 11 as in the radius of curvature of the first curved portion 35 (refer to FIG. 3).

The second locking part 51 includes: a concave-shaped concave portion 53 which can accommodate the convex portion 43; and first and second projecting portions 55a and 55b which are positioned so as to sandwich the concave portion 53. As shown in FIG. 2 and FIG. 5, the inner portion of the concave portion 53 in the concave direction is formed in an arc shape that has the same diameter as the end portion of the convex portion 43 in the expanding direction. The first and second projecting portions 55a and 55b respectively have first and second protruding portions 57a and 57b which protrude from the end portion of the first and second projecting portions 55a and 55b toward the opening of the concave portion 53.

In the width direction of the semimanufactured product of the stopper 31, maximum size L5 of the convex portion 43 is set to comparable size to maximum size L6 of the concave portion 53. Thereby, the convex portion 43 is configured to be able to be accommodated smoothly with respect to the interior space of the concave portion 53 in the process in Step 3 described later (refer to FIG. 7) when making the first and second locking parts 41 and 51 engage with each other.

In the expanding direction of the convex portion 43, the height L7 of the convex portion 43 with respect to the shoulder portions 46 is set to comparable size to the depth size L8 of the concave portion 53 with respect to the projecting portion 55. In addition, the height L10 of the protruding portions 57 with respect to the projecting portion 55 is set to size larger than the concave shape depth size L9 of the guide surface 48. Thereby, in the process in Step 3 described later (refer to FIG. 7), tip portions of the protruding portion 57 are configured to press and contact with the depressed portions in the guide surfaces 48 before the tip portion of the convex portion 43 presses and contacts with the inner portion of the concave portion 53 upon making the first and second locking parts 41 and 51 engage with each other.

Furthermore, the gap L11 (refer to FIG. 3) between the first and second locking parts 41 and 51 is larger than the diameter D of the stabilizer bar 11 (L11>D). Thereby, in the process in Step 2 described later (refer to FIG. 7), it is configured such that the work for setting the stabilizer bar 11 onto the inner circumferential surface of the first curved portion 35 can be smoothly performed without damaging the outer peripheral surface of the stabilizer bar 11.

[Method for Installing a Semimanufactured Product of a Stopper onto a Stabilizer Bar According to an Embodiment of the Present Invention]

Next, a method for installing the semimanufactured product of the stopper 31 onto the stabilizer bar 11 according to an embodiment of the present invention will be described with reference to FIG. 7, FIG. 8, FIG. 9A to FIG. 9D, FIG. 10 and FIG. 11.

First, first and second molds 61 and 63 (refer to FIG. 8) that are used in the method for installing the semimanufactured product of the stopper 31 to the stabilizer bar 11 will be described. A half cylinder shaped cavity 62 that can accommodate a external shape of the first curved portion 35 out of the semimanufactured product of the stopper 31 without a gap is formed in the first mold 61. Meanwhile, a half cylinder shaped cavity 64 that can accommodate an external shape of the second curved portion 37 out of the semimanufactured product of the stopper 31 is formed in the second mold 63 also. The first mold 61 is a fixed side lower mold, which is fixed with respect to the manufacturing equipment (not illustrated) with the horizontal state maintained. Meanwhile, the second mold 63 is a movable side upper mold, which faces with the first mold 61 and moves up and down vertically with the horizontal state maintained.

Figure 7:
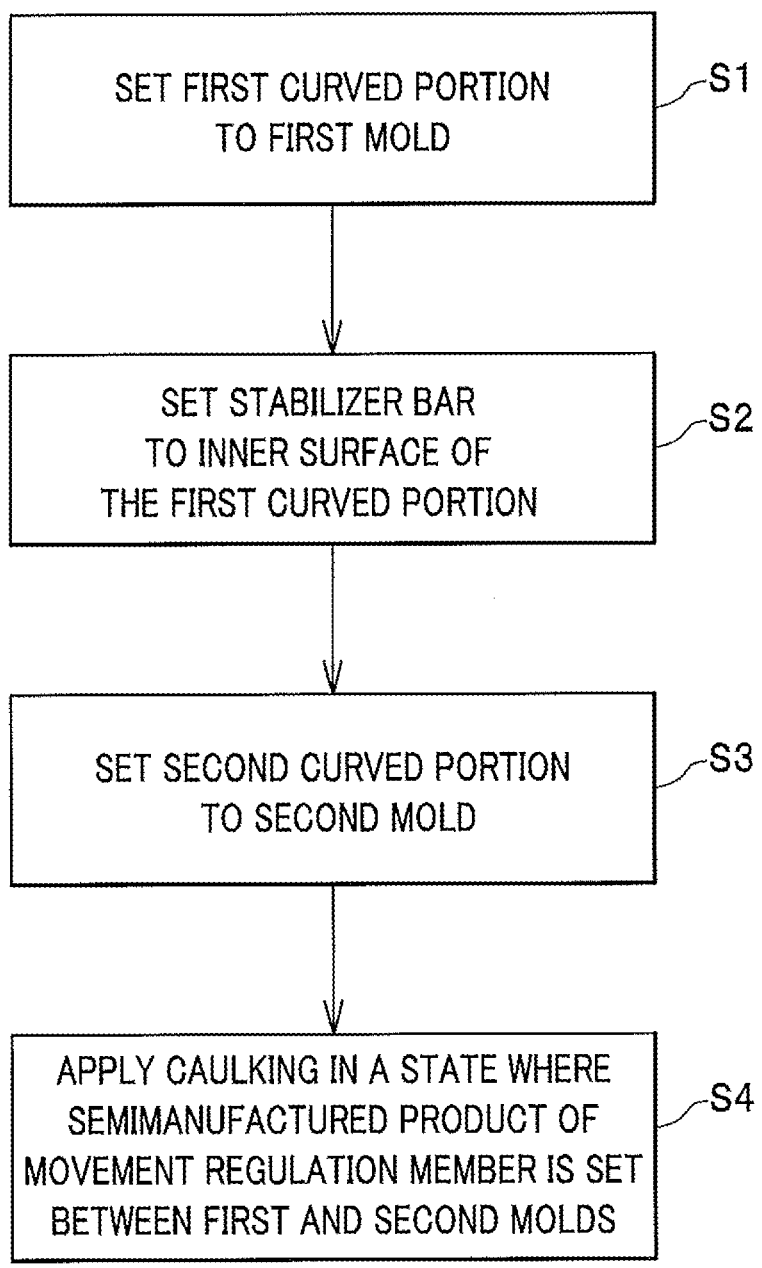
FIG. 7 shows a process chart that illustrates the outline of a method for installing the semimanufactured product of the stopper to the stabilizer bar according to the embodiment of the present invention.
Figure 8:
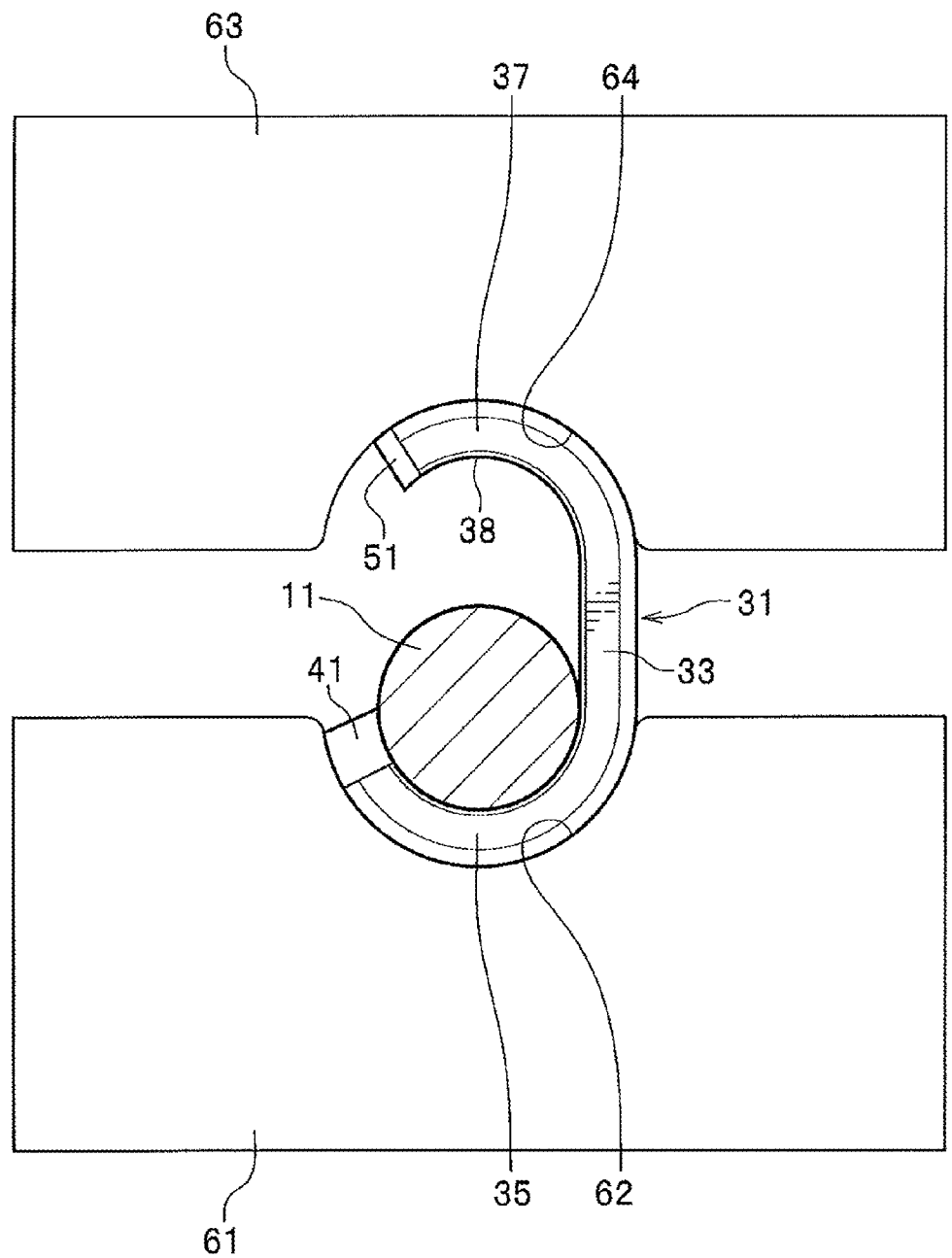
FIG. 8 shows a diagram that schematically illustrates a state before performing clamping work in the process chart illustrated in FIG. 7.

In Step S1 shown in FIG. 7, the first curved portion 35 out of the semimanufactured product of the stopper 31 is set onto the first mold 61.

In Step S2, the stabilizer bar 11 is set onto the inner circumferential surface of the first curved portion 35 through a gap L11 (refer to FIG. 3) between the first and second locking parts 41 and 51 in a state where the first curved portion 35 out of the semimanufactured product of the stopper 31 is set in the cavity 62 at the first mold 61.

In Step S3, the second curved portion 37 out of the semimanufactured product of the stopper 31 is set onto the second mold 63. Thereby, preparation for installing the semimanufactured product of the stopper 31 onto the stabilizer bar 11 is completed.

In Step S4, force that pushes vertically the second mold 63 that is at the movable side is applied onto the first mold 61 that is at the fixed side in a state where the semimanufactured product of the stopper 31 is set between the first and second molds 61 and 63. Thereby, the inner circumferential surface of the bridging portion 33 and the first and second curved portions 35 and 37 are made to pressingly contact with the outer peripheral surface of the stabilizer bar 11, and clamping work for making the first and second locking parts 41 and 51 engage with each other is carried out as well.

Figure 9A:
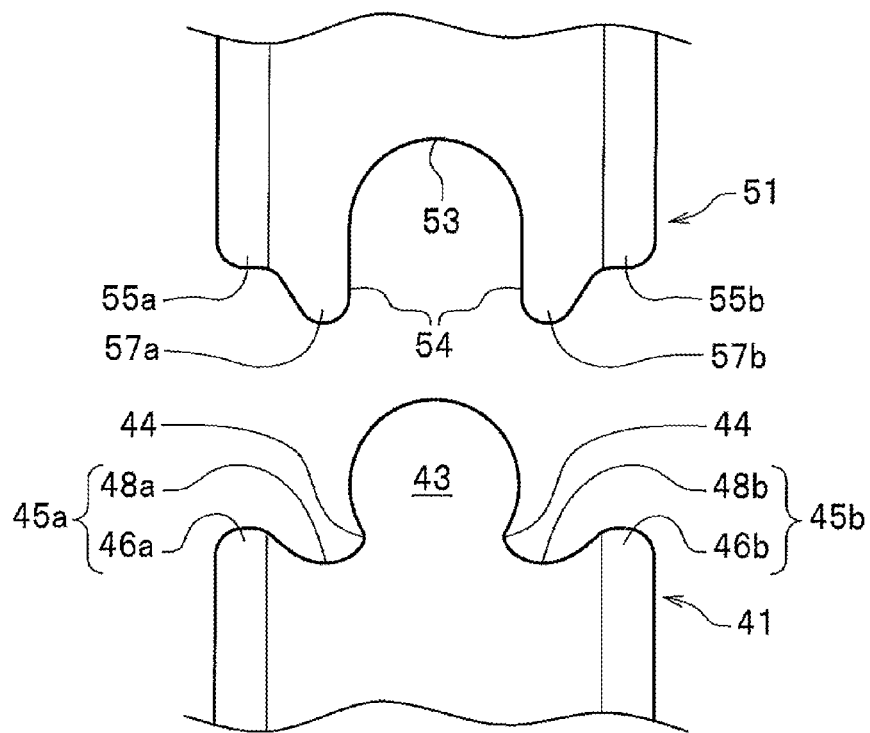
FIG. 9A shows an explanatory drawing that schematically illustrates a state before the first and second locking parts are engaged in the step of performing clamping work.
Figure 9B:
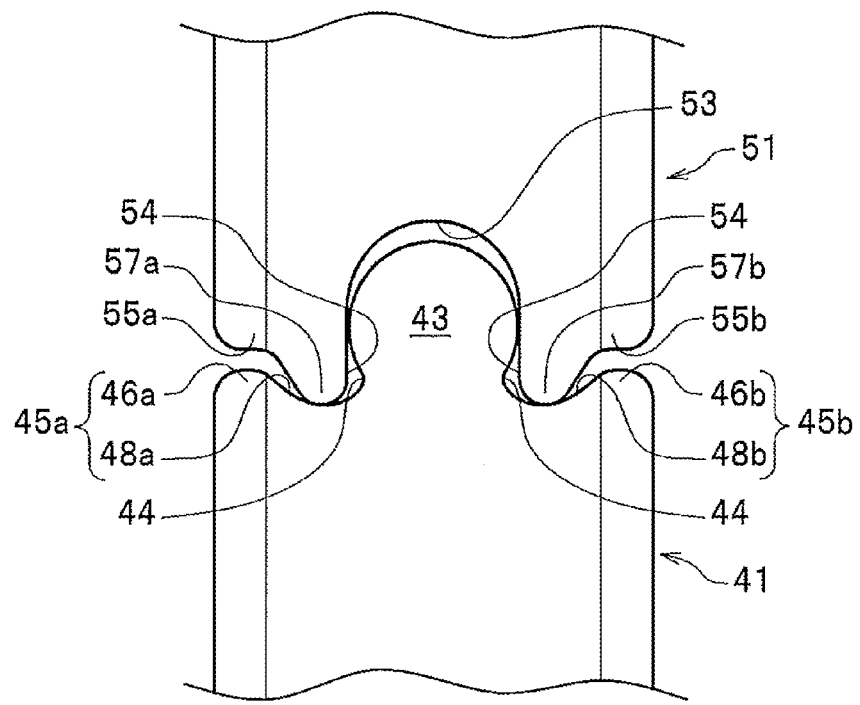
FIG. 9B shows an explanatory drawing that schematically illustrates a state where the tip portion of the protruding portion is advanced into and is in contact with the depressed part of the guide surface in the step of performing clamping work.

In the step of performing clamping work in Step S4, when pushing force of the clamping work is applied in a state where the first and second locking parts 41 and 51 face each other (refer to FIG. 9A), first, the convex portion 43 is accommodated in the concave portion 53, and the first and second protruding portions 57a and 57b contact with the first and second guide surfaces 48a and 48b of the first and second receiving portions 45a and 45b, respectively, as well (refer to FIG. 9B).

Figure 9C:
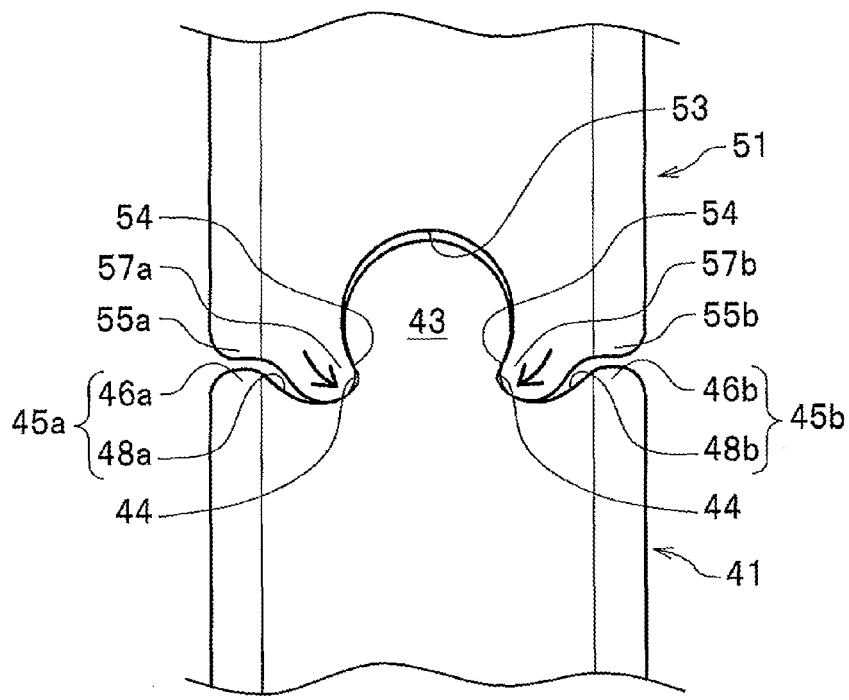
FIG. 9C shows an explanatory drawing that schematically illustrates a state where the protruding portion is plastically deformed by being pressed onto the guide surface so as to reside in the constricted part in the step of performing clamping work.
Figure 9D:
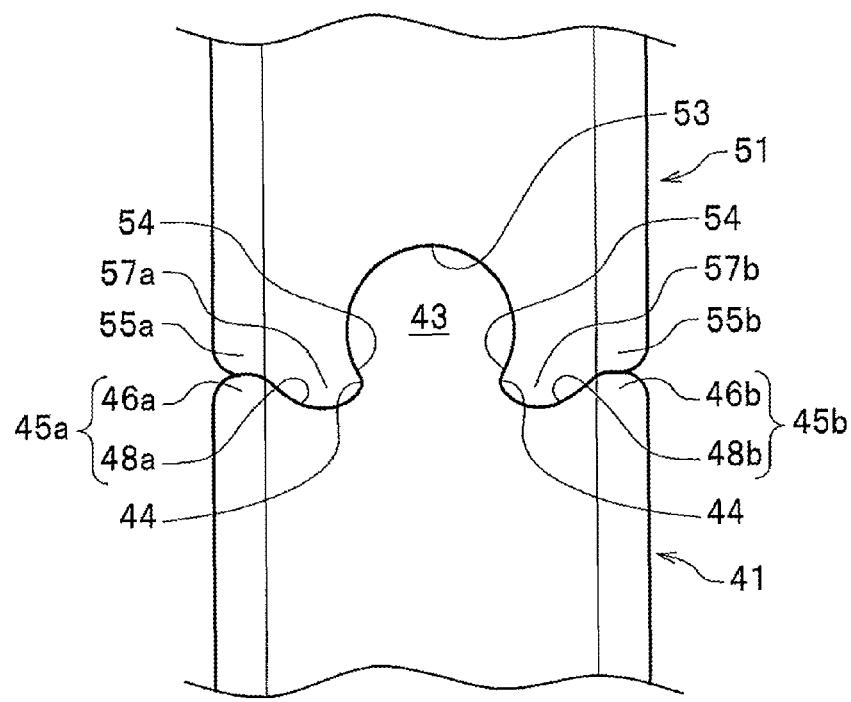
FIG. 9D shows an explanatory drawing that schematically illustrates a state where the first and second locking parts are engaged with each other in the step of performing clamping work.

Thereafter, by being pressed onto the first and second guide surfaces 48a and 48b that are continuous to the first and second shoulder portions 46a and 46b, the first and second protruding portions 57a and 57b are plastically deformed so as to fill concave spaces sectioned by the first and second guide surfaces 48a and 48b including the constricted portions 44 toward inner sides in the width direction of the first locking part 41 (refer to FIG. 9C). As a result, the concave spaces are filled without a gap by being filled with the plastically deformed first and second protruding portions 57a and 57b. By performing the above processes, the semimanufactured product of the stopper 31 becomes a completed product 69 (refer to FIG. 10 and FIG. 11) to be reliably installed onto the stabilizer bar 11.

Figure 10:
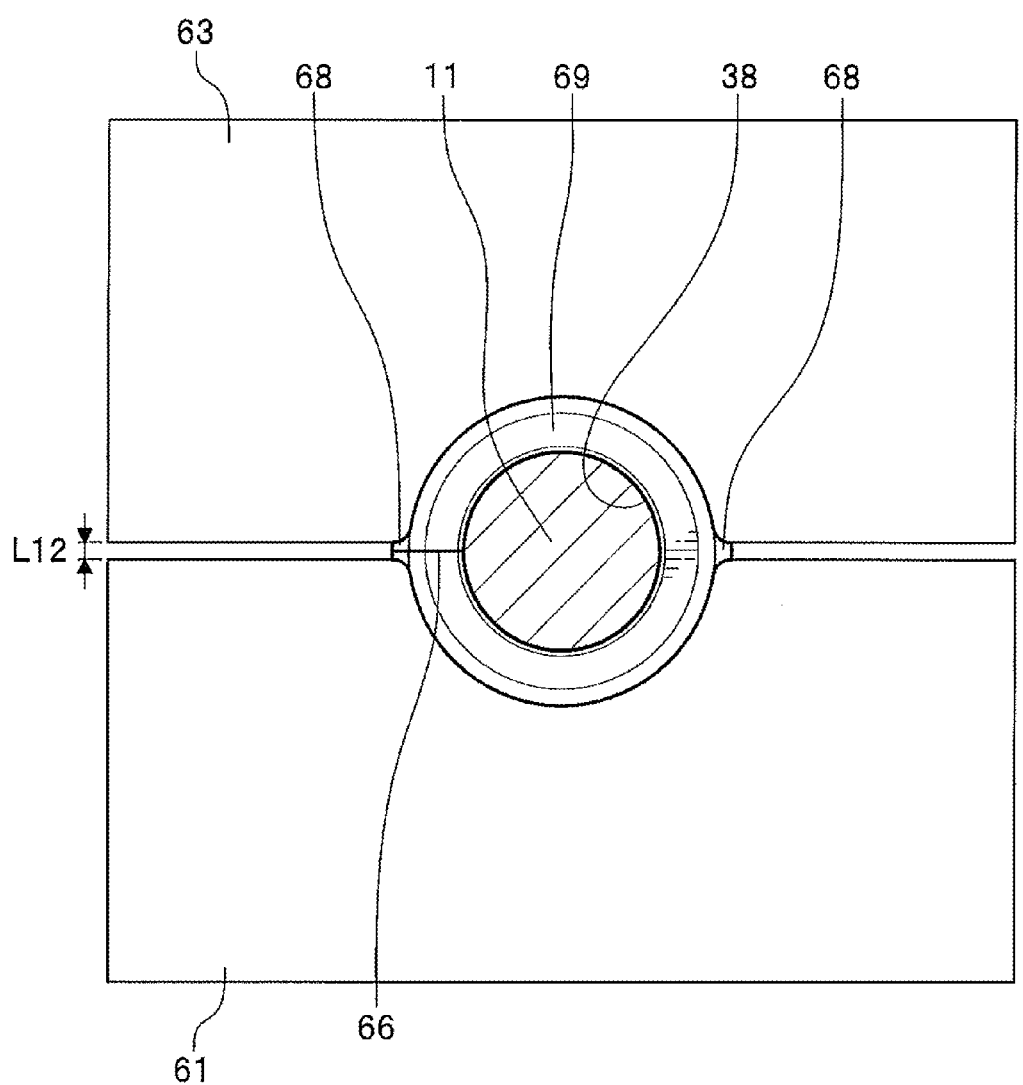
FIG. 10 shows an explanatory drawing that schematically illustrates a state where the semimanufactured product of the stopper is pressed and crushed while leaving the gap for forming burr between the first and second molds in the process of clamping work.
Figure 11:
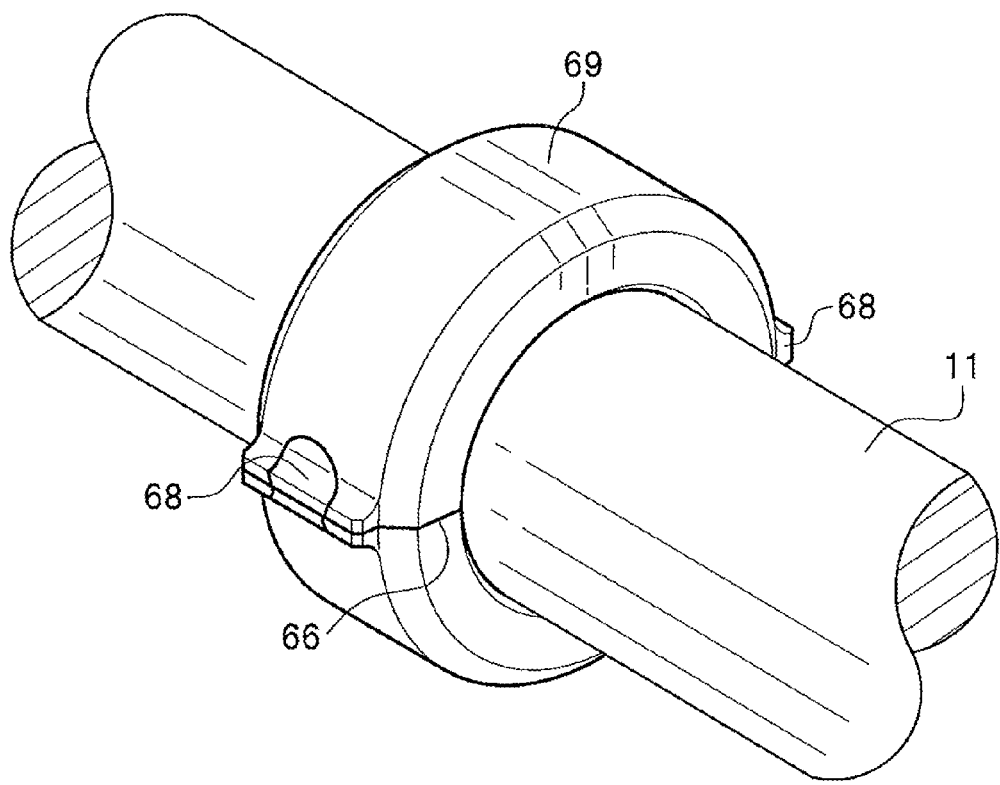
FIG. 11 shows a perspective view that illustrates the stabilizer bar in a state where the stopper is installed.

In addition, in the step of performing clamping work in Step S4, a burr protruding portion 68 that extends over the width of the semimanufactured product of the stopper 31 in the width direction is formed in the outer wall of the engagement portion 66 by pressing and crushing the semimanufactured product of the stopper 31 with a gap L12 (refer to FIG. 10) for forming burr remaining between the first and second molds 61 and 63, in a state where the engagement portion 66 between the first and second locking parts 41 and 51 is positioned near the boundary portion between the first and second molds 61 and 63 (refer to FIG. 10 and FIG. 11). Thereby, engagement force between the first and second locking parts 41 and 51 can be further strengthened as a result of the progress of plastic deformation at the engagement portion 66.

[Second Locking Part According to a Modified Embodiment]

Figure 12:
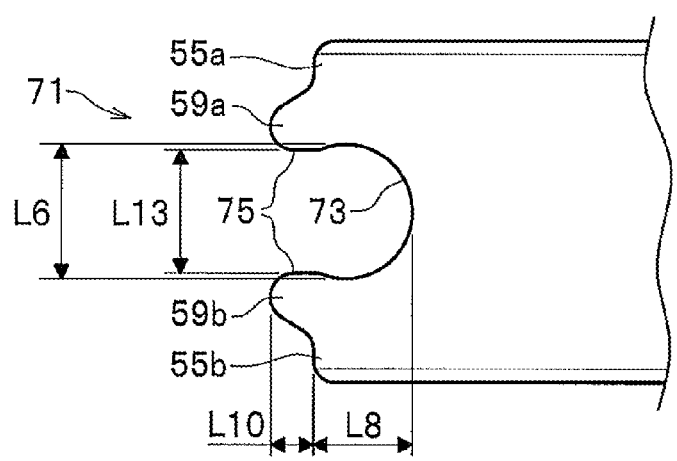
FIG. 12 shows a plan view that illustrates an expanded example of the modified embodiment of the second locking part.
Figure 13A:
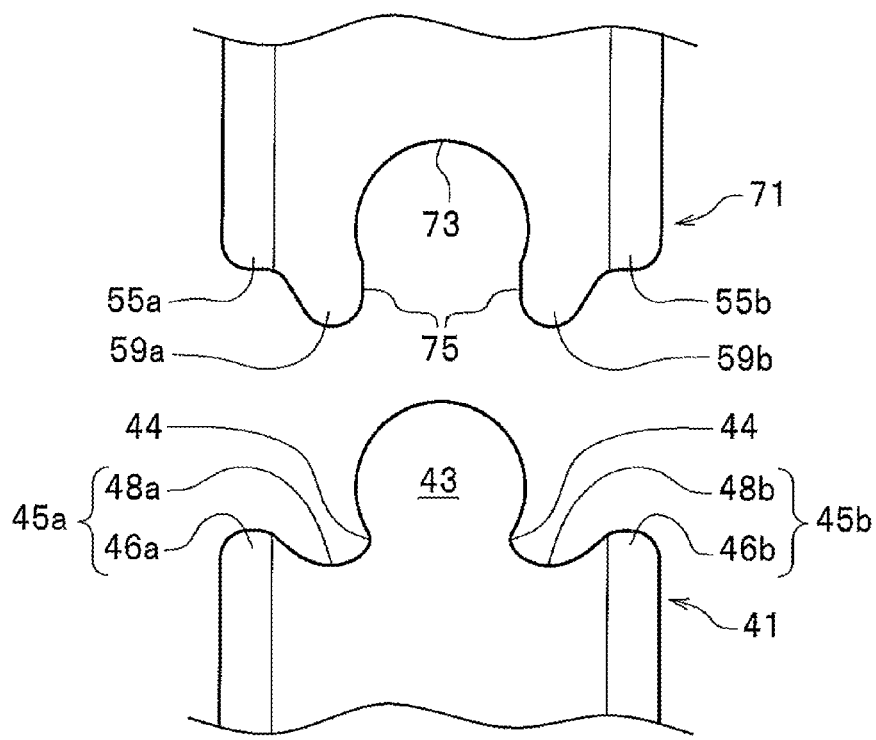
FIG. 13A shows an explanatory drawing that schematically illustrates a state before the first and second locking parts are engaged in the clamping work process of the second locking part according to the example of modified embodiment shown in FIG. 12.

Next, a second locking part 71 according to a modified embodiment will be described with reference to FIG. 12, FIG. 13A and FIG. 13B. The basic configuration is the same between the second locking part 51 and the second locking part 71 according to the modified embodiment. Accordingly, the second locking part 71 according to the modified embodiment will be described by paying attention to different points between 51 and 71.

There are roughly two different points between 51 and 71. The first different point is that, in the concave portion 53 according to the second locking part 51, the size of the opening (excluding the inner portion) 54 of the concave portion 53 in the width direction of the semimanufactured product of the stopper 31 is set to a uniform size L6 (refer to FIG. 6), whereas in the second locking part 71 according to the modified embodiment, the size of the opening (excluding the inner portion) 75 of the concave portion 73 in the width direction of the semimanufactured product of the stopper 31 is set to size L13 (L13<L6: refer to FIG. 12) slightly reduced as compared with the size L6 of the opening 54 of the concave portion 53 according to the second locking part 51. Note that its rate of reduction in size (L13/L6) is about 75% to 95%.

The second different point is that the volume of the first and second protruding portions 59a and 59b (refer to FIG. 12) according to the second locking part 71 according to the modified embodiment is larger than the volume of the first and second protruding portions 57a and 57b (refer to FIG. 6) of the second locking part 51. It should be noted that the second locking part 71 according to the modified embodiment including the first and second projecting portions 55a and 55b (refer to FIG. 12) that are positioned to sandwich the concave portion 73 is the same as the second locking part 51.

However, the size of the inner portion of the concave portion 73 according to the second locking part 71 according to the modified embodiment is the same as the size L6 of the opening 54 of the concave portion 53 according to the second locking part 51. In addition, a point where the second locking part 71 according to the modified embodiment engages with the first locking part 41 is the same as the second locking part 51.

In the second locking part 71 according to the modified embodiment, the depth size L8 (refer to FIG. 12) of the concave portion 73 with respect to the projecting portion 55 is set to comparable size to the height L7 of the convex portion 43 with respect to the shoulder portions 46 in the expanding direction of the convex portion 43 included in the first locking part 41. In addition, the height L10 of the protruding portion 59 with respect to the projecting portion 55 is larger as compared with the concave shape depth size L9 of the guide surface 48 of the first locking part 41.

Figure 13B:
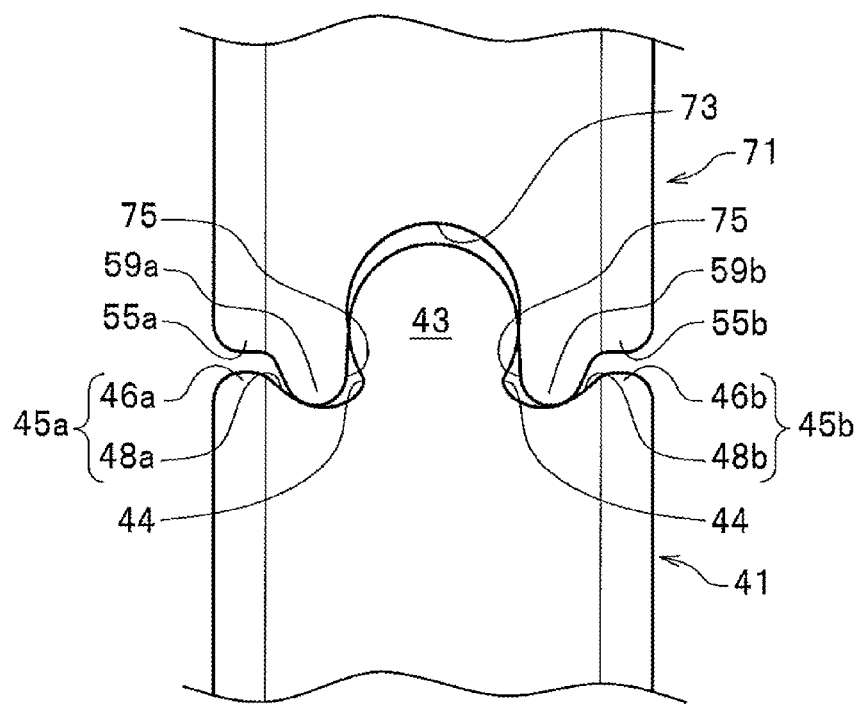
FIG. 13B shows an explanatory drawing that schematically illustrates a state where the tip portion of the protruding portion advances into and is in contact with the depressed part of the guide surface in the clamping work process of the second locking part according to the example of modified embodiment shown in FIG. 12.

In the step of performing clamping work for the second locking part 71 according to the modified embodiment, when pressing force in clamping work is applied in a state where the first locking part 41, and the second locking part 71 according to the modified embodiment face each other (refer to FIG. 13A), first, the convex portion 43 is accommodated in the concave portion 73 while pushing and expanding the opening 75 of the concave portion 73, and the first and second protruding portions 59a and 59b once move toward outside in the width direction of the first locking part 41 as the opening 75 is pushed and expanded and contact with the first and second guide surfaces 48a and 48b of the first and second receiving portions 45a and 45b, respectively, as well (refer to FIG. 13B).

Here, there are noticeable points that correspond to each of the first and second different points. The first noticeable point corresponding to the first different point is that, in the step of performing clamping work for the second locking part 71 according to the modified embodiment, the part in the guide surface 48 that contacts with the tip portion of the protruding portion 59 is positioned to be offset toward outside in the width direction of the first locking part 41 as compared with the step of performing clamping work for the second locking part 51. As a result, the tip portion of the protruding portion 57 contacts with the midway portion of the concave-shaped slope surface of the guide surface 48 (refer to FIG. 13B).

The second noticeable point corresponding to the second different point is that, in the step of performing clamping work for the second locking part 71 according to the modified embodiment, the degree of filling, which is density, at the time of filling the tip portion of the protruding portion 59 for the second locking part 71 into the concave spaces sectioned by the first and second guide surfaces 48a and 48b including the constricted portions 44 is higher than the step of performing clamping work for the second locking part 51. This is based on the fact that the volume of the tip portion of the protruding portion 59 in the second locking part 71 is larger as compared to the volume of the tip portion of the protruding portion 57 in the second locking part 51. As a result, with the second locking part 71 according to the modified embodiment, it is possible to improve the engagement force between the first and second locking parts 41 and 71 further as compared with the second locking part 51.

Thereafter, as in the step of performing clamping work for the second locking part 51, the first and second protruding portions 59a and 59b are plastically deformed so as to fill the constricted portions 44 toward the inner side in the width direction of the first locking part 41 by being pressed by the first and second guide surfaces 48a and 48b that are continuous to the first and second shoulder portions 46a and 46b (refer to FIG. 9C). As a result, the first and second protruding portions 59a and 59b thus plastically deformed are filled in the concave spaces sectioned by the first and second guide surfaces 48a and 48b including the constricted portions 44, and thus the concave space is filled without a gap with high degree of filling. By performing the above processes, the semimanufactured product of the stopper 31 becomes the completed product 69 (refer to FIG. 10 and FIG. 11) to be reliably installed onto the stabilizer bar 11.

[Actions and Effects of the Semimanufactured Product of the Stopper According to an Embodiment of the Present Invention]

Actions and effects of the semimanufactured product of the stopper 31 according to an embodiment of the present invention will be described now. The semimanufactured product of the stopper 31 according to the embodiment of the present invention includes the following basic configuration. That is, the semimanufactured product of the stopper 31 includes: the plate-shaped bridging portion 33; the first curved portion 35 extending integrally from one end portion of the bridging portion 33; and the second curved portion 37 extending integrally from the other end portion of the bridging portion 33, and the entirety of the semimanufactured product of the stopper 31 is formed in a C-shape. The first curved portion 35 has at its end portion the first locking part 41. Meanwhile, the second curved portion 37 has at its end portion the second locking part 51 that engages with the first locking part 41.

The first locking part 41 has a pair of receiving portions 45 positioned so as to sandwich the convex-shaped convex portion 43 and the convex portion 43. Meanwhile, the second locking part 51 includes a concave-shaped concave portion 53 which can accommodate the convex portion 43; and a pair of projecting portions 55 positioned so as to sandwich the concave portion 53. The pair of projecting portions 55 respectively include the protruding portion 57 which protrudes from a tip portion of the projecting portion 55 toward the opening 54 of the concave portion 53. The convex portion 43 includes at its base end portions the constricted portions 44.

The pair of receiving portions 45 include: the shoulder portions 48 which are positioned at the outer side in the width direction of the first locking part 41 and protrude in the expanding direction of the convex portion 43; and the guide surfaces 48 which are inclined to a direction opposite to the expanding direction of the convex portion 43 toward the constricted portions 44 with respect to the shoulder portions 46 and are dented. The height L10 of the pair of protruding portions 57 is larger as compared with the depth L9 of the concave shape in the guide surface 48. In addition, the gap L11 between the first and second locking parts 41 and 51 is larger as compared with the diameter D of the stabilizer bar 11. The basic configuration that the semimanufactured product of the stopper 31 according to the embodiment of the present invention basically has been described in the above.

In the semimanufactured product of the stopper 31 according to the basic configuration, the inner circumferential surface of the bridging portion 33 and the first and second curved portions 35 and 37 is made to pressingly contact with the outer peripheral surface of the stabilizer bar 11 using the pair of molds 61 and 63 which respectively cover the outer circumferential side of the first and second curved portions 35 and 37, in a state where the stabilizer bar 11 is placed onto the inner circumferential surface of one curved portion among the first and second curved portions 35 and 37 by passing the stabilizer bar 11 through the gap L11, and the clamping work for making the first and second locking parts 41 and 51 engage with each other is carried out as well.

Then, the convex portion 43 is accommodated in the concave portion 53, and the pair of protruding portions 57 is plastically deformed so as to fill the concave spaces sectioned by the guide surfaces 48 including the constricted portions 44 toward the inner side in the width direction of the first locking part 41 by being pressed by the guide surfaces 48 which are continuous to the shoulder portions 46 after contacting with the guide surfaces 48 of the pair of receiving portions 45. As a result, the concave space is filled without a gap by the protruding portion 57 thus plastically deformed is filled into the concave space. Thereby, the semimanufactured product of the stopper 31 becomes the completed product 69 and is reliably installed onto the stabilizer bar 11.

According to the semimanufactured product of the stopper 31 according to the basic configuration, the stopper 23 can be reliably installed onto the stabilizer bar 11 with a simple process, and it is possible to reliably prevent the positional movement of the stopper 23 in the axial direction of the stabilizer bar 11, and make management of the parts easier, and deal with automatic assembly.

In the semimanufactured product of the stopper 31 according to the basic configuration, it may be configured such that the radius of curvature of the inner circumferential surface of one curved portion where the stabilizer bar 11 is set (the first curved portion 35 in this embodiment) among at least the first and second curved portions 35 and 37 may be set to the same size as the radius (D/2) of the stabilizer bar 11, and length (L3: refer to FIG. 4) of the inner circumferential surface along the curving direction of the one curved portion (the first curved portion 35) is set longer as compared with length (L4: refer to FIG. 4) of the inner circumferential surface along the curving direction of the other curved portion (the second curved portion 37).

By configuring in this way, the state of the stabilizer bar 11 set onto the inner circumferential surface of the one curved portion (the first curved portion 35) can be stabilized by securing the area in the stabilizer bar 11 contacting onto the inner circumferential surface of the one curved portion (the first curved portion 35).

In addition, in the semimanufactured product of the stopper 31 according to the basic configuration, it may be configured such that maximum size (L5: refer to FIG. 5) of the convex portion 43 in the width direction of the semimanufactured product of the stopper 31 is set to comparable size to maximum size (L6: refer to FIG. 6) of the concave portion 53 in the width direction of the semimanufactured product of the stopper 31 (L5=L6).

By configuring in this way, the convex portion 43 can be smoothly fit into the concave portion 53 when performing clamping work for making the first and second locking parts 41 and 51 engage with each other using the pair of molds 61 and 63.

In addition, in the semimanufactured product of the stopper 31 according to the basic configuration, it may have a configuration of the second locking part 71 of the modified embodiment described later (hereafter referred to as "modified embodiment of the basic configuration"). That is, maximum size (L5: refer to FIG. 5) of the convex portion 43 in the width direction of the semimanufactured product of the stopper 31 is set slightly greater than maximum size (L13: refer to FIG. 12) of the opening 75 of the concave portion 73 in the width direction of the semimanufactured product of the stopper 31 (L5=L6>L13). In the semimanufactured product of the stopper 31, the inner circumferential surface of the bridging portion 33 and the first and second curved portions 35 and 37 is made to pressingly contact with the outer peripheral surface of the stabilizer bar 11 using a pair of molds 61 and 63 that respectively cover the outer circumferential surface of the first and second curved portions 35 and 37 in a state where the stabilizer bar 11 is placed on the inner circumferential surface of one curved portion among the first and second curved portion 35 and 37 by passing the stabilizer bar 11 through the gap L11, and the clamping work for making the first and second locking parts 41 and 51 engage with each other is carried out as well. As a result, the convex portion 43 is accommodated in the concave portion 73 while pushing and expanding the opening 75 of the concave portion 73, and after contacting with the guide surfaces 48 of the pair of receiving portions 45, the pair of protruding portions 59 which once moved toward outer side of the first locking part 41 in the width direction as a result of the push and expansion of the opening 75 are plastically deformed so as to fill the constricted portions 44 toward the inner side of the first locking part 41 in the width direction by being pressed by the guide surfaces 48 which are continuous to the shoulder portions 46. As a result, the concave space is filled without a gap with high degree of filling by the protruding portions 59 thus plastically deformed being filled into the concave spaces sectioned by the guide surfaces 48 including the constricted portions 44. Therefore, the semimanufactured product of the stopper 31 becomes the completed product 69 and is reliably installed onto the stabilizer bar 11.

According to the configuration of the second locking part 71 according to the modified embodiment, it is possible to improve the engagement force between the first and second locking parts 41 and 71 furthermore as compared with the semimanufactured product of the stopper 31 according to the basic configuration.

In addition, in the basic configuration or the semimanufactured product of the stopper 31 according to the modified embodiment of the basic configuration, it may have a configuration where the end portion of the convex portion 43 in the expanding direction and the inner portion of the concave portions 53 and 73 in the concave direction are formed in a circular shape having the same diameter.

In addition, in the basic configuration or the semimanufactured product of the stopper 31 according to the modified embodiment of the basic configuration, it may have a configuration where anti-sliding work, such as providing the knurl 38, is performed onto the inner circumferential surface of the bridging portion 33 and the first and second curved portions 35 and 37, which pressingly contact with the outer peripheral surface of the stabilizer bar 11.

Since the frictional force between the inner circumferential surface of the bridging portion 33 and the first and second curved portions 35 and 37 and the outer peripheral surface of the stabilizer bar 11 can be improved by configuring in this way, it is possible to improve further the effect of preventing the positional movement of the stopper 23 with respect to the axial direction of the stabilizer bar 11.

In addition, the stabilizer bar 11 having the stopper 23 can be obtained by the basic configuration or the semimanufactured product of the stopper 31 according to the modified embodiment of the basic configuration becoming the completed product 69 to be installed. According to the stabilizer bar 11 having the stopper 23, the positional movement of the stopper 23 in the axial direction of the stabilizer bar 11 can be reliably prevented.

Meanwhile, the below configuration may be adopted as a fundamental method used when installing the semimanufactured product of the stopper 31 according to the basic configuration is installed onto the stabilizer bar 11 for a vehicle. That is, the basic method includes: a step of setting the first and second curved portions 35 and 37 onto the first and second molds 61 and 63, which respectively include the cavities 62 and 64 in which the outer circumferential side of the first and second curved portions 35 and 37 is accommodated; a step of placing the stabilizer bar 11 on the inner circumferential surface of one curved portion (the first curved portion 35 in the present embodiment) among the first and second curved portions 35 and 37 by passing the stabilizer bar 11 through the gap L11; a step of pressingly contacting the inner circumferential surface of the bridging portion 33 and the first and second curved portions 35 and 37 onto the outer peripheral surface of the stabilizer bar 11 by using the first and second molds 61 and 63, and performing clamping work for making the first and second locking parts 41 and 51 engage with each other, in a state where the stabilizer bar 11 is placed on the inner circumferential surface of the one curved portion (the first curved portion 35).

Furthermore, in the step of performing clamping work, the convex portion 43 is accommodated in the concave portion 53, and after contacting with the guide surfaces 48 of the pair of receiving portions 45, the pair of protruding portions 57 are pressed onto the guide surfaces 48 which are continuous to the pair of shoulder portions 46 and are plastically deformed so as to fill the concave spaces sectioned by the guide surfaces 48 including the constricted portions 44 toward the inner side in the width direction of the first locking part 41, and thus the semimanufactured product of the stopper 31 becomes the completed product 69 to be installed onto the stabilizer bar 11.

According to the basic method, it is possible to reliably install the stopper 23 onto the stabilizer bar 11 with a simple process that can deal with automatic assembly.

In addition, the following configuration may be adopted as a modified embodiment of the basic method that is used when installing the semimanufactured product of the stopper 31 according to the modified embodiment of the basic configuration onto the stabilizer bar 11 for a vehicle. That is, in the step of performing clamping work, the convex portion 43 is accommodated in the concave portion 73 by pushing and expanding the opening 75 of the concave portion 73, and after contacting the guide surfaces 48 of the pair of receiving portions 45, the pair of protruding portions 59 that once moved toward the outer side in the width direction of the first locking part 41 as the opening 75 is pushed and expanded are plastically deformed so as to fill the concave spaces sectioned by the guide surfaces 48 including the constricted portions 44 toward the inner side in the width direction of the first locking part 41 by being pressed onto the guide surfaces 48 which are continuous to the pair of shoulder portions 46, and thus the semimanufactured product of the stopper 31 becomes the completed product 69 to be installed onto the stabilizer bar 11.

Since the concave spaces sectioned by the guide surfaces 48 including the constricted portions 44 can be filled without a gap with the protruding portion 59 with high degree of filling according to the modified embodiment of the basic method, the engagement force between the first and second locking parts 41 and 71 can be improved furthermore as compared with the basic method.

The basic method or the modified embodiment of the basic method may adopt a configuration where, in the step of performing clamping work, the circumferentially extending burr protruding portion 68 is integrally formed on the outer wall of the engagement portion by pressing and crushing the semimanufactured product of the stopper 31 while maintaining the gap L12 (refer to FIG. 10) for forming burr between the first and second molds 61 and 63, in a state where at least the engagement portion between the first and second locking parts 41 and 51 is positioned near the boundary portion of the first and second molds 61 and 63.

By configuring in this way, since the circumferentially extending burr protruding portion 68 is integrally formed on the outer wall of the engagement portion between the first and second locking parts 41 and 51, the engagement force between the first and second locking parts 41 and 51 can be improved remarkably.

In addition, it is possible to obtain a stabilizer bar 11 having the stopper 23 by installing the stopper 23 onto the stabilizer bar 11 using the basic method or the modified embodiment of the basic method. According to the stabilizer bar 11 having the stopper 23, the positional movement of the stopper 23 in the axial direction of the stabilizer bar 11 can be reliably prevented.

[Other Embodiments]

Examples of implementation of the present invention have been described in relation to several embodiments described above. Therefore, the technical scope of the present invention should not be restrictively interpreted with these. This is because the present invention can be implemented in various forms without deviating from gist or main feature of the present invention.

For example, in an embodiment according to the present invention, an example where the first locking part 41 is provided at the end portion of the first curved portion 35, whereas the second locking part 51 is provided at the end portion of the second curved portion 37. However, the present invention is not limited to such an example. Contrary to the above, a configuration that provides the second locking part 51 on the end portion of the first curved portion 35, and provides the first locking part 41 on the end portion of the second curved portion 37.

For example, in an embodiment according to the present invention, an example in which the inner portion of the concave portion 53 in the concave direction is formed as an arc shape having the same diameter as the end portion of the convex portion 43 in the expanding direction. However, the present invention is not limited to such an example. The end portion of the convex portion 43 in the expanding direction and the inner portion of the concave portion 53 in the concave direction can be of any shape as long as the inner portion of the concave portion 53 in the concave direction has a shape that corresponds with each other so as to be able to accommodate the end portion of the convex portion 43 in the expanding direction tightly.

In addition, in the embodiment according to the present invention, an example in which the first mold 61 is a lower mold at the fixed side, whereas the second mold 63 is an upper mold at the movable side, has been described. However, the present invention is not limited to such an example. For example, contrary to the above, the first mold 61 may be an upper mold at the movable side and the second mold 63 may be a lower mold at the fixed side. Furthermore, an embodiment where both of the first and second molds 61 and 63 simultaneously apply force in mutually approaching directions.

In addition, an embodiment according to the present invention has been described by using an example that administers anti-sliding work onto the inner circumferential surface of the bridging portion 33 and the first and second curved portions 35 and 37, which pressingly contacts with the outer peripheral surface of the stabilizer bar 11 by defining the knurl 38. However, the present invention is not limited to such an example. Any shape can be adopted as a shape that targets the slippage stop work, which is set onto the inner circumferential surface of the bridging portion 33 and the first and second curved portions 35 and 37.

In addition, in the embodiments according to the present invention, chamfering work may be administered onto a single edge portion along a longitudinal direction in the bridging portion 33 and the first and second curved portions 35 and 37.

[Description Of Reference Numerals]

11: stabilizer bar
23*a*: first stopper (movement regulation member)
23*b*: second stopper (movement regulation member)
31: semimanufactured product of a stopper (movement regulation member)
33: bridging portion
35: first curved portion
37: second curved portion
41: first locking part
43: convex portion
45*a*: first receiving portion (receiving portion)
45*b*: second receiving portion (receiving portion)
46*a*: first shoulder portion (shoulder portion)
46*b*: second shoulder portion (shoulder portion)
48*a*: first guide surface (guide surface)
48*b*: second guide surface (guide surface)
51: second locking part
53: concave portion
55*a*: first projecting portion (projecting portion)
55*b*: second projecting portion (projecting portion)
57*a*: first protruding portion (protruding portion)
57*b*: second protruding portion (protruding portion)
61: first mold (mold)
63: second mold (mold)
68: burr protruding portion
L11: gap between the first and second locking parts
D: diameter of the stabilizer bar

The invention claimed is:

1. A semimanufactured product of a movement regulation member to be installed onto a stabilizer bar for a vehicle, wherein
the semimanufactured product includes: a plate-shaped bridging portion; a first curved portion which extends from one end portion of the bridging portion integrally; and a second curved portion which extends from the other end portion of the bridging portion integrally, and an entirety of the semimanufactured product is formed in a C-shape;
the first curved portion includes a first locking part at an end portion of the first curved portion;

the second curved portion includes a second locking part that engages with the first locking part at an end portion of the second curved portion;

the first locking part includes a convex-shaped convex portion and a pair of receiving portions positioned so as to sandwich the convex portion;

the second locking part includes a concave-shaped concave portion which can accommodate the convex portion and a pair of projecting portions positioned so as to sandwich the concave portion;

each of the pair of projecting portions includes a protruding portion which protrudes from a tip portion of the projecting portion toward an opening of the concave portion;

the convex portion includes a constricted portion in a base end portion of the convex portion;

the pair of receiving portions include: a shoulder portion which is positioned at an outer side of the first locking part in a width direction and projects in an expanding direction of the convex portion; and a guide surface which is inclined to a direction opposite to the expanding direction of the convex portion toward the constricted portion with respect to the shoulder portion;

height of the pair of protruding portions is larger as compared with depth of the concave shape of the guide surface;

a gap between the first and second locking parts is larger as compared with diameter of the stabilizer bar, and the semimanufactured product of the movement regulation member is to be installed onto the stabilizer bar as a completed product by making an inner circumferential surface of the bridging portion and the first and second curved portions pressingly contact with an outer circumferential surface of the stabilizer bar using a pair of molds which cover outer peripheral sides of the first and second curved portions, respectively, in a state where the stabilizer bar is placed onto an inner circumferential surface of one curved portion among the first and second curved portions by passing the stabilizer bar through the gap;

by accommodating the convex portion in the concave portion upon administrating clamping work that makes the first and second locking parts engage with each other; and by the pair of protruding portions being plastically deformed so as to fill concave spaces sectioned by the guide surface including the constricted portions toward an inner side in a width direction of the first locking part by being pressed onto the guide surfaces which are continuous to the shoulder portions after contacting the guide surface of the pair of receiving portions.

2. The semimanufactured product of a movement regulation member according to claim 1, wherein radius of curvature of an inner circumferential surface of one curved portion where the stabilizer bar is placed on among at least the first and second curved portions is set to the same size as radius of the stabilizer bar; and length of an inner circumferential surface along a curving direction of the one curved portion is set longer as compared with length of an inner circumferential surface along a curving direction of the other curved portion.

3. The semimanufactured product of a movement regulation member according to claim 1, wherein maximum size of the convex portion in the width direction of the semimanufactured product is set to comparable size to maximum size of the concave portion in the width direction of the semimanufactured product.

4. The semimanufactured product of a movement regulation member according to claim 1, wherein maximum size of the convex portion in the width direction of the semimanufactured product is slightly larger than maximum size of the opening of the concave portion in the width direction of the semimanufactured product;

the semimanufactured product of the movement regulation member is to be installed onto the stabilizer bar as a completed product by accommodating the convex portion in the concave portion while pushing and expanding the opening of the concave portion upon administrating clamping work that makes the first and second locking parts engage with each other; and by the pair of protruding portions that once moved toward an outer side of the first locking part in a width direction as the opening is pushed and expanded being plastically deformed so as to fill concave spaces sectioned by the guide surface including the constricted portions toward an inner side in a width direction of the first locking part by being pressed onto the guide surfaces which are continuous to the shoulder portions after contacting the guide surface of the pair of receiving portions.

5. The semimanufactured product of a movement regulation member according to claim 1, wherein an end portion of the convex portion in the expanding direction and an inner portion of the concave portion in a concave direction are formed in a circular shape having the same diameter.

6. The semimanufactured product of a movement regulation member according to claim 1, wherein anti-sliding work is administrated on an inner circumferential surface of the bridging portion and the first and second curved portions, which pressingly contact an outer peripheral surface of the stabilizer bar.

7. A stabilizer bar including a movement regulation member, wherein the semimanufactured product of a movement regulation member according to claim 1 is installed as a completed product.

8. A method for installing a semimanufactured product of a movement regulation member onto a stabilizer bar for a vehicle, wherein the semimanufactured product includes: a plate-shaped bridging portion; a first curved portion which extends from one end portion of the bridging portion integrally; and a second curved portion which extends from the other end portion of the bridging portion integrally, and an entirety of the semimanufactured product is formed in a C-shape;

the first curved portion includes a first locking part at an end of the first curved portion;

the second curved portion includes a second locking part that engages with the first locking part at an end portion of the second curved portion;

the first locking part includes a convex-shaped convex portion and a pair of receiving portions positioned so as to sandwich the convex portion;

the second locking part includes a concave-shaped concave portion which can accommodate the convex portion and a pair of projecting portions positioned so as to sandwich the concave portion;

each of the pair of projecting portions includes a protruding portion which protrudes from a tip portion of the projecting portion toward an opening of the concave portion;

the convex portion includes a constricted portion in a base end portion of the convex portion;

the pair of receiving portions include: a shoulder portion which is positioned at an outer side of the first locking part in a width direction and projects in an expanding direction of the convex portion; and a guide surface which is inclined to a direction opposite to the expanding direction of the convex portion toward the constricted portion with respect to the shoulder portion;

height of the pair of protruding portions is larger as compared with depth of the concave shape of the guide surface;

a gap between the first and second locking parts is larger as compared with diameter of the stabilizer bar;

a step of setting the first and second curved portions to first and second molds that have a cavity in which an outer circumferential surface of the first and second curved portions is accommodated, respectively;

a step of placing the stabilizer bar on an inner circumferential surface of one curved portion among the first and second curved portions by passing the stabilizer bar through the gap;

a step of making an inner circumferential surface of the bridging portion and the first and second curved portions pressingly contact with an outer peripheral surface of the stabilizer bar using the first and second molds in a state where the stabilizer bar is placed onto an inner circumferential surface of the one curved portion, and performing clamping work which makes the first and second locking parts engage with each other; and the semimanufactured product of the movement regulation member is to be installed onto the stabilizer bar as a completed product in the step of performing clamping work, by the convex portion being accommodated in the concave portion, by the pair of protruding portions being plastically deformed so as to fill concave spaces sectioned by the guide surface including the constricted portions toward an inner side in a width direction of the first locking part by being pressed onto the guide surfaces which are continuous to the shoulder portions after contacting the guide surface of the pair of receiving portions.

9. The method for installing a semimanufactured product of a movement regulation member onto a stabilizer bar according to claim 8, wherein maximum size of the convex portion in the width direction of the semimanufactured product is slightly larger than maximum size of the opening of the concave portion in the width direction of the semimanufactured product, and the semimanufactured product of the movement regulation member is to be installed onto the stabilizer bar as a completed product in the step of performing clamping work, by the convex portion being accommodated in the concave portion while pushing and expanding the opening of the concave portion, by the pair of protruding portions that one moved toward an outer side of the first locking part in a width direction as the opening is pushed and expanded being plastically deformed so as to fill concave spaces sectioned by the guide surface including the constricted portions toward an inner side in a width direction of the first locking part by being pressed onto the guide surfaces which are continuous to the shoulder portions after contacting the guide surface of the pair of receiving portions.

10. The method for installing a semimanufactured product of a movement regulation member onto a stabilizer bar according claim 8, wherein a circumferentially extending burr protruding portion is integrally formed on an outer wall of the engagement portion in the step of performing clamping work by pressing and crushing the semimanufactured product of the movement regulation member while maintaining a gap for forming burr between the first and second molds in a state where an engagement portion between at least the first and second locking parts is positioned near a boundary portion of the first and second molds.

11. A stabilizer bar having a movement regulation member, wherein the movement regulation member is installed using the method for installing a semimanufactured product of a movement regulation member onto a stabilizer bar according to claim 8.

* * * * *